Nov. 22, 1966  J. V. PETRIELLO  3,287,202

PLASTIC-METAL LAMINATES

Filed June 1, 1962

*INVENTOR.*
JOHN V. PETRIELLO
BY James P. Malone

United States Patent Office 3,287,202
Patented Nov. 22, 1966

3,287,202
PLASTIC-METAL LAMINATES
John V. Petriello, North Babylon, N.Y., assignor to Dilectrix Corporation, Farmingdale, N.Y.
Filed June 1, 1962, Ser. No. 199,540
7 Claims. (Cl. 161—60)

This invention relates to an improved and novel flexible film construction and a method for its preparation.

It is an object of this invention to provide a means for decreasing the permeation of gases and liquids through plastic films. This object is accomplished by providing a composite laminar structure whose cross section consists of inorganic barriers in the form of flakes or fibers fused to the integral plastic lamination.

Another object of this invention is to provide a low permeability composite construction having adequate durability and flexibility.

A still further object of this invention is to provide a low permeability, flexible film or sheeting from chemically inert fluorocarbon polymers including related chemical structures and copolymers.

A still further object of this invention is to provide a multiple laminate metallic flake barrier within a plastic membrane or sheeting such that the flexibility and other plastic characteristics are retained to a reasonable degree.

A still further object is to provide means and methods whereby a precise alignment and array of the metal flake barriers are incorporated into a wide variety of laminated structures.

Figure 1:
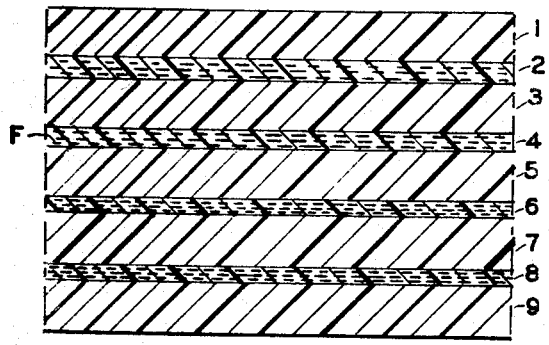
Figure 2:
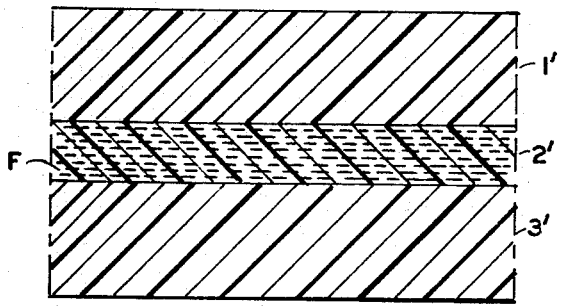

These and other objects of the invention will be apparent from the following specification and drawings of which FIGS. 1 and 2 are greatly enlarged cross sectional views of the embodiments of the invention.

Figure 3:
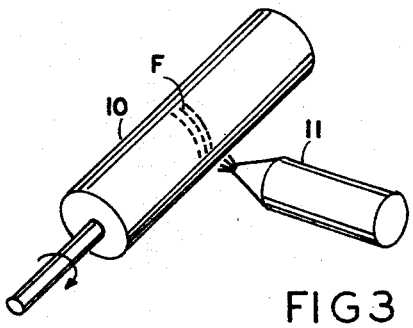

FIG. 3 is a schematic diagram illustrating the method of applying the coating of the present invention.

FIG. 1 illustrates a greatly enlarged cross sectional arrangement of a fused, integral laminate structure comprising a typical series of layers 1, 3, 5, 7 and 9 of resin separated by barrier layers 2, 4, 6, 8 of admixtures of the polymeric inter-layer with metallic flakes F arranged substantially parallel to the line of lamination. The barrier layers maintain a continued structure with the contained resin to assure adherence of the admixed flakes. Layer 1 for instance comprises essentially the resin layer covering an intermediate barrier 2 made from the admixture of the resin with the metal flake. The same sequence continues on with the remaining numerically indexed laminations to any desired film, membrane or sheet thickness.

FIG. 2 illustrates another arrangement of the barrier interlaminar structure 2' to which is superposed layers 1' and 3' of the unadmixed resin.

FIG. 3 illustrates the method of spraying the coating of the present invention. A mandrel form 10 is rotatably mounted and turned at a predetermined speed by a motor, not shown, while the coating is sprayed on by a spray gun 11 in a direction perpendicular to the direction of motion. The spray gun is moved longitudinally along the form to cover the entire area thereof. The form may be of aluminum and it may be removed from the coating by dissolving out the form. The form may be of any desired shape, The speed of rotation is chosen together with the viscosity of the spray containing the metal flakes so that the metal flakes F will tend to line up in parallel relation.

As will be evident from the ensuing examples that the prearranged array of the barriers if made according to the procedures of this invention, imparts a marked reduction in permeation to gases and liquids. Generally, any decrease in permeation in resinous or plastics is desirable. This is particularly important in flexible containers, sealants, gasket, separators, and many other devices for containment of liquid for handling or for process operations. In current industrial practice, many varieties of admixtures to plastic or resinous substrates are applied with little regard to alignment unless it is by chance or by use of certain woven constructions which have certain limitations as to flexibility. In the series of laminations described in this invention it has therefore been the aim to retain flexibility or non-rigid character along with the decrease in permeation. The proper alignment of a permeation barrier is important also to maintain a level of durability against folding and flexures.

The random incorporation of any barrier material often leads to a weakened structure and one that can fail mechanically both by propagation of cracks and by delamination. In this invention, the proper selection of specific flakes and their proper arrangement throughout the cross-section has overcome these defects. The laminated constructions provided with permeation barriers have been designed and tested to meet numerous requirements including handling of corrosive reagents and in the storage of certain fuels used for energetic reactions in positive propulsion systems. The following examples illustrate typical applications with the implied improvements.

Example 1

A series of three nominally 10 mil films, designated A, B and C in following tabulations were prepared, substantially equivalent in thickness, by a 20 spray-coating schedule using a codispersion of fluorocarbon resins comprising 95% by volume of polytetrafluoroethylene ("Teflon 30," hereinafter called TFE dispersion) and 5% by weight of the copolymer of tetrafluoroethylene and hexafluoropropylene "Teflon 120," hereinafter called FEP dispersion), and, where indicated by a further appropriate admixture with aluminum flake. The spray-coatings were applied over an aluminum mandrel, 12-inch long, 5-inch diameter, 0.040-inch wall, rotating at 60 r.p.m. while an appropriate spray of the described codispersion was applied from a spray gun. Each spraying delivered from 0.00025 to 0.0005 inch of layer which was sintered at 340–400° C. for 10–30 minutes in an air circulating oven followed by cooling to room temperature before a succeeding spray coating was applied.

*Composition A.*—This is an unmodified control film, that is, made without any added metal flake according to the following schedule:

| Layer | Thickness, inch | Codispersion, Percent Vol. | Metal Flake, Percent Vol. |
|---|---|---|---|
| 1 to 20 Coatings | 0.010 | 100 | None |

*Composition B.*—This is a multi-layered laminate comprising four interlayers with the metallic flake barrier made of powdered aluminum flakes of a leafing grade, separated by unmodified layers.

| Layer | Thickness, inch | Codispersion, Percent Vol. | Metal Flake, Percent Vol. |
|---|---|---|---|
| 1 (Top) | 0.0010±0.0002 | 100 | |
| 2, 4, 6, 8 (Barrier) | [1] 0.0005±0.0001 | 80 | 20 |
| 3, 5, 7, 9 (Bottom) | [1] 0.0015±0.0001 | 100 | |
| Total | 0.0090±0.0010 | | |

[1] Each.

*Composition C.*—This is a single barrier laminate made according to the following schedule:

| Layer | Thickness, inch | Codispersion, Percent Vol. | Metal Flake, Percent Vol. |
|---|---|---|---|
| 1 (Top) | 0.0035±0.0002 | 100 | |
| 2 (Barrier) | 0.0020±0.0002 | 80 | 20 |
| 3 (Bottom) | 0.0035±0.0002 | 100 | |
| Total | 0.0090±0.0006 | | |

The metal flake in compositions B and C was an Alcoa leafing grade designated by the manufacturer as Grade 420 of minus 325 mesh or approximately less than 44 microns in the largest plate dimension and having a specific gravity of 2.50, compared to an average specific gravity of 2.16 for the TFE-FEP Codispersion used for computing the respective, approximate volumes employed in these schedules. Following the final application of the spray-coating and sintering, the above three films were separated from the aluminum mandrel, by dissolving the latter in concentrated caustic solution, washed repeatedly with deionized water, and dried at 85° C. for eight hours.

To compare the barrier effect of the flake-containing layers, permeability tests were run using helium gas in a conventional type of apparatus where the volume of helium passing through the film is measured by manometric deflection. The following tabulation indicates the results of such test carried out at 25° C. for a period of 24 hours.

| Composition | Thickness, inch | Permeation Rate, cc. Helium/100 Sq. In./24 Hours/Mil. |
|---|---|---|
| A | 0.010 | 440 |
| B | 0.010 | 55 |
| C | 0.010 | 75 |

These data indicate a pronounced decrease by a factor of approximately eight in going from Composition A to the multilayered barrier Composition B which represents a significant improvement in resisting the permeation of gases through a film or membrane. A marked improvement is also gained with the single barrier Composition C although not quite as pronounced as that of Composition B.

In another permeability test of similar films using commercial nitrogen tetroxide, a similar reduction in the order of 6 to 8 was obtained in the comparison of a film made according to Composition A and B, further confirming the effectiveness of the multi-layered barrier.

As is evident from the above example, the term multi-layered barrier is intended to mean an interposition of the metal flake with the TFE-FEP codispersion layer with distinct boundaries and thickness dimensions in relation to a layer of TFE-FEP without any added metallic flake. This is in contrast to a single barrier layer of equivalent volume as represented by Composition C. Both compositions have distinct merits but Composition B has an added advantage as being the more flexible of the two, a feature highly essential to positive expulsion containers such as described in my co-pending application Serial No. 198,954, filed May 31, 1962, entitled Flexible Containers. As each layer is sintered it is fused to the next preceding layer. This general sintering process without the flakes is described in my Patent No. 2,852,811 granted September 23, 1958 entitled Method for Casting Thin Plastic Films.

Composition B has been found to have two additional features that single out its value as a flexible film for containers, namely, fold endurance and flexibility. Permeation tests using helium have shown these features in fold tests in the following series of composite structures, supplemented by a laminate composition D with a topically applied electroplated nickel.

In this test the films were folded ten times across a 5-inch diameter test sample.

| Composition | Thickness, inch | Helium Permeation (25.0° C.), cc./100 Sq. In. 24/Hours. |
|---|---|---|
| A | 0.010 | 710 |
| B | 0.010 | 102 |
| C | 0.010 | 160 |
| D* | 0.010 | 1,040 |

*One Mil Nickel Electrodeposited on top and bottom of composition A

The data indicate continued retention of the barrier effect on the part of the multi-layered and single-layered barrier laminates. Surprisingly, the topically applied barrier of electrodeposited nickel appears to have weakened the film in its structure and significantly increased its permeability rate. In the latter case microscopic examination revealed that the deposited metal was highly random with crevices that appeared to propagate as cracks into the film. This finding lends further emphasis to the advantages of the design of the laminate barrier structures as described in this invention.

*Example 2*

As a barrier laminate film for chemical resistance to corrosive reagents, a composite structure using nickel flake and designated Composition E was prepared according to FIGURE 1 using the spray-coating schedule described for the aluminum flake in above Example 1, comprising the following based on a 95/5 ratio of codispersion of TFE and FEP resins.

| Composition E Layer | Thickness, inch | Codispersion, percent vol. | Metal Flake, percent vol. |
|---|---|---|---|
| 1 (Top) | 0.0010±0.0002 | 100 | |
| 2, 4, 6, 8 (Barrier) | ¹0.0005±0.0001 | 75 | 25 |
| 3, 5, 7, 9 (Bottom) | ¹0.0015±0.0001 | 100 | |
| Total | 0.0090±0.0006 | | |

¹ Each.

The metal flake in this case was a commercial grade of minus 325-mesh nickel manufactured by the Metals Disintegrating Company and designated as their product MD–750 leafing grade. The resulting Composition E film indicated an 80% decrease in permeation rate of nitrogen tetroxide compared to Composition A film described in Example 1. Of special significance was the observation that Composition E was flexed over 100 times without showing more than 5 to 10 percent increase in permeation. Under similar flexing conditions Composition D of Example 1 assumed a highly permeable broken structure filled with crevices and voids. In helium permeation tests, the nickel flake barrier effect was also evident as indicated in the following tabulation:

| Composition | Thickness, inch | Helium Permeation (25.0° C.), cc./100 Sq. In./24 Hours. |
|---|---|---|
| A (Control) | 0.006 | 770 |
| E | 0.006 | 95–138 |

It is evident that a 1:5 to 1:7 fold decrease in permeation is attained by the nickel flake barrier which is regarded as extremely significant. In this instance the nickel had the approximate dimension of less than 44 microns in the laminar plane and approximately 5 to 10 microns in the width dimensions aligned by the rotating action of the mandrel on which it was sprayed with the codispersion to produce the most effective barrier side of the flake.

By adjusting the rotating speed and the viscosity of the spray composition with admixed nickel flake, the degree of orientation of the flake normal or at right angles to the permeation path has thus been optimized. It has been found in this series that increasing the speed of the rotation of the aluminum mandrel improves and maximizes this alignment at right angles to the permeation path provided that the tangential thrust is not too great so as to throw off the major portion of the sprayed dispersion. It has also been found that low viscosity of the codispersion with the admixed metal flake also maximizes the normal alignment of the flake with respect to the permeation path.

*Example 3*

As a barrier laminate film for handling highly corrosive reagents, a composite structure using gold flake (Composition F) was prepared according to the basic features of FIG. 1 with slight modification in the number of layers using the spray technique described for aluminum flake in Example 1. In this composite structure, an 80/20 ratio of codispersion of TFE and FEP resins was used to prepare the following laminated structure:

| Composition F Layer | Thickness, inch | Codispersion, Percent Vol. | Gold Flakes, Percent Vol. |
|---|---|---|---|
| 1 (Top) | 0.0020 | 100 | |
| 2, 4, 6 (Barrier) | 1 0.0002 | 80 | 20 |
| 3, 5, 7 (Bottom) | 1 0.0010 | 100 | |
| Total | 0.0056 | | |

1 Each.

The gold metal flake in this case was a specially prepared hammered and disintegrated foil stock screened to minus 325 mesh giving a flake structure of less than 44 microns in plate dimension and approximately 5 to 10 microns in thickness.

Helium permeation tests made in comparison with a similar Composition G in which the gold was applied by vacuum metallizing are tabulated as follows:

| Composition | Thickness, inch | Helium Permeation (23.5° C.), cc./100 Sq. In./24 Hours |
|---|---|---|
| A (Control) | 0.0060 | 740 |
| F | 0.0056 | 45 |
| G | 0.0060 | 580 |

In this instance, the flake sprayed composite of gold showed at least one order of magnitude drop in permeation compared to the control Composition A. Of particular significance is the marked difference in the permeation values between the vacuum metallized and the flake-sprayed composite, lending additional emphasis to not only the desirability of the flake orientation but also the size range of the particles. The particle size of the vacuum metallized metal are two or three orders of magnitude less than the metallic flake and films, hence not capable of presenting a right angle or normal deflecting barrier.

The above examples have served merely to illustrate the unique effect of the metal flake as applied under spraying application conditions and mandrel rotation to assure maximum alignment normal or at right angles to the permeation path. Almost any type of a flake structure similarly applied can be used within the description of this invention. Excellent barrier composite structures can be made from other metals including silver, lead, iron, stainless steel and other alloy and alloying combinations. By appropriate dilution of the total dispersions and rotating mandrel motion during spray application, the alignment has been found to work quite satisfactorily with fibrous materials including natural mineral fibers such as asbestos and inorganic synthetic fibers made from silica and related silicates. Once one has adapted the rotation-spray procedure to produce the composite structures, one can quite readily shift to fibrous materials provided they are well dispersed to achieve effective permeation barriers. It has also been found feasible to prepare barriers of mixtures of flake materials and fibrous materials, an effective one being a 10 volume percent nickel flake and a 10 volume percent of disintegrated asbestos admixed with an 80/20 TFE-FEP codispersion diluted with water to ultimately contain 25 percent total solids. By flake in this sense is meant a material having plate-like structures such that the length-width/thickness ratio is in the range of at least 2/1 and preferably higher. By fibers in this sense is meant a material having a length/diameter ratio of at least 2/1 and preferably higher. The preferred gross particulate size is in the range of 100 to 1 micron, the size being dictated by the ability to mechanically provide a good steady spray of the admixed dispersions to the mandrel surface or supporting substrate. An important aspect in the flake structure is to assure thorough dispersement and avoid agglomeration of the contained solids. Those versed in the art can make appropriate adjustments with suitable disbursing agents, extenders, viscosifying agents, and other extenders in order to achieve this characteristic.

While the examples shown here indicate the use of the perfluorocarbon polymers derived from tetrafluoroethylene either as a homopolymer or copolymer with hexafluoropropylene, it has been found that similar, effective barrier laminates can be made from dispersions of polychlorotrifluoroethylene. Additionally it is feasible to prepare the laminated composite structures of FIGS. 1 and 2 by employing other halogenated olefins including polyvinylidene fluoride and its copolymers with hexafluoropropylene which is an elastomer type composition that can be cured to varying degree of elastomeric characteristics.

By dispersions is meant a fluid composition in which the ultimate polymer size is less than 10 microns and preferably in the range of approximately 1 to 0.02 microns.

While the arrangement of the metal flake barrier in the above examples and in FIGS. I and II is substantially that of continuous layers running parallel to the film surface, the concept of this invention has been successfully applied to modulated structures where the barrier is discontinued for a predetermined distance and then resumed. By modulated structure is meant that there is a difference in the modulus from one cross section to another effected through the admixture with the metallic flake such that a measurable difference in flexural or compressive modulus is evident. Such a novel arrangement is already described in my above mentioned copending U.S. application. The TFE-FEP codispersion may be varied from 5 to 95% volume respectively to 95 to 5% volume respectively.

Although the invention has been described in detail, these have been by way of explanation and not of limitation. Many modifications may be made by those who desire to practice the invention without departing from the scope thereof which is defined by the following claims:

I claim:

1. Gas and liquid permeation barrier means consisting of a composite film structure derived from fused polytetrafluoroethylene comprising a cross-sectional arrangement with first alternating layers having parallel metallic flakes serving as a permeation barrier, and second alternating layers of unadmixed resin to provide a non-rigid and flexible structure, said flakes being arranged parallel to the film sides and to each other.

2. Gas and liquid permeation barrier means consisting of a composite film construction derived from a mixture of polytetrafluoroethylene and its copolymer with hexafluoropropylene comprising a cross-sectional arrangement with regular or irregular first alternating layers of resin-metal flake admixtures serving to provide decreased permeation in which the metal flakes are parallel to each other and normal to the permeation path and second alternating layers of unadmixed resin to provide a non-rigid continuation of the structure.

3. Gas and liquid permeation barrier means consisting of a composite film structure,
   a permeation resin barrier containing 5 to 95 volume percent metallic flakes in predetermined arrangement parallel to each other, said flakes being in the order of 40 to 100 microns in the laminar plane dimension and 5 to 25 microns in thickness, said barrier resin containing polytetrafluoroethylene and its copolymer hexafluoropropylene, in proportions from 5 to 95 volume percent and 95 to 5%, respectively.

4. Gas and liquid permeation barrier means consisting of a composite film structure containing permeation barriers as in claim 3 in alternating layers separated by, but fused to, alternating layers of a mixture of polytetrafluoroethylene and its copolymer in proportions of 5 to 95% and 95 to 5%, respectively.

5. Gas and liquid permeation barrier means consisting of a plastic metal laminate comprising
   a first resin layer and
   a second resin layer having parallel metal flakes suspended therein, said layers being fused together.

6. Gas and liquid permeation barrier means consisting of a plastic metal laminate comprising
   a first resin layer,
   a second resin layer having parallel metal flakes suspended therein, said layers being fused together, and
   a third resin layer on the other side of said metal flake layer, said layers being fused together.

7. Gas and liquid permeation barrier means consisting of a plastic-metal laminate comprising
   a plurality of pure resin layers, and
   a plurality of resin layers reinforced with inorganic parallel flakes, said reinforced layers being separated by said pure resin layers, all of said layers being fused together.

References Cited by the Examiner
UNITED STATES PATENTS

| | | | |
|---|---|---|---|
| 2,833,686 | 5/1958 | Sandt | 161—189 X |
| 2,852,811 | 9/1958 | Petriello | 18—57 |
| 2,949,150 | 8/1960 | Traynor | 161—189 X |
| 2,961,345 | 11/1960 | Petriello | 117—138.8 |
| 3,045,121 | 7/1962 | Leguillon | 250—108 |

EARL M. BERGERT, *Primary Examiner.*

L. T. PIRKEY, M. SUSSMAN, *Assistant Examiners.*